United States Patent
Mizrahi et al.

(10) Patent No.: US 9,209,920 B2
(45) Date of Patent: *Dec. 8, 2015

(54) CLOCK SYNCHRONIZATION USING MULTIPLE NETWORK PATHS

(71) Applicant: Marvell Israel (M.I.S.L) Ltd., Yokneam (IL)

(72) Inventors: Tal Mizrahi, Haifa (IL); Alexander Shpiner, Nesher (IL)

(73) Assignee: MARVELL ISRAEL (M.I.S.L.) LTD., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/175,858

(22) Filed: Feb. 7, 2014

(65) Prior Publication Data

US 2014/0161143 A1 Jun. 12, 2014

Related U.S. Application Data

(62) Division of application No. 13/764,732, filed on Feb. 11, 2013.

(60) Provisional application No. 61/706,526, filed on Sep. 27, 2012, provisional application No. 61/695,367, filed on Aug. 31, 2012, provisional application No. 61/695,371, filed on Aug. 31, 2012, provisional application No. 61/647,123, filed on May 15, 2012, provisional application No. 61/644,722, filed on May 9, 2012, provisional application No. 61/597,092, filed on Feb. 9, 2012.

(51) Int. Cl.
*H04J 3/06* (2006.01)
*G06F 15/16* (2006.01)

(52) U.S. Cl.
CPC ............ *H04J 3/0661* (2013.01); *H04J 3/0664* (2013.01); *H04J 3/0667* (2013.01); *H04J 3/0658* (2013.01)

(58) Field of Classification Search
None
See application file for complete search history.

(56) References Cited

U.S. PATENT DOCUMENTS 6,360,271 B1 3/2002 Schuster et al.
7,277,954 B1 * 10/2007 Stewart et al. ................ 709/230

(Continued)

FOREIGN PATENT DOCUMENTS

DE 10 2008026391 A1 12/2009
EP 2254267 A1 11/2010

(Continued)

OTHER PUBLICATIONS

IEEE Std. 1588™—2008 (Revision of IEEE Std. 1588-200), "IEEE Standard for a Precision Clock Synchronization Protocol for Networked Measurement and Control Systems," The Institute for Electrical and Electronics Engineers, Inc., IEEE Standard, Jul. 2008.

(Continued)

*Primary Examiner* — Faruk Hamza
*Assistant Examiner* — Cassandra Decker

(57) ABSTRACT

A packet transmitted by a master clock via a network is received via a port of a network device. The packet includes a time stamp from the master clock. It is determined via which one of a plurality of communication path in the network the packet was received. An application layer module of the network device uses (i) the time stamp in the packet and (ii) the determination of the communication path to determine time information.

33 Claims, 7 Drawing Sheets

(56) References Cited

U.S. PATENT DOCUMENTS

| | | | |
|---|---|---|---|
| 7,876,791 | B2 | 1/2011 | Jung et al. |
| 7,990,909 | B2 | 8/2011 | Brueckheimer |
| 8,483,271 | B2 | 7/2013 | Chen et al. |
| 8,644,348 | B2 | 2/2014 | Zampetti |
| 8,730,868 | B2 | 5/2014 | Yamada et al. |
| 8,774,227 | B2 | 7/2014 | Rahbar |
| 2005/0152330 | A1* | 7/2005 | Stephens et al. ............... 370/350 |
| 2006/0218298 | A1* | 9/2006 | Knapp et al. .................. 709/238 |
| 2009/0147806 | A1 | 6/2009 | Brueckheimer |
| 2009/0190482 | A1* | 7/2009 | Blair ............................ 370/250 |
| 2010/0020909 | A1 | 1/2010 | Jung et al. |
| 2010/0296406 | A1 | 11/2010 | Rahbar |
| 2010/0296524 | A1 | 11/2010 | Rahbar |
| 2012/0269204 | A1 | 10/2012 | Zampetti |
| 2013/0208735 | A1 | 8/2013 | Mizrahi et al. |
| 2013/0223458 | A1 | 8/2013 | Bui |
| 2013/0259049 | A1 | 10/2013 | Mizrahi |

FOREIGN PATENT DOCUMENTS

| | | |
|---|---|---|
| WO | WO-2012065823 A1 | 5/2012 |
| WO | WO-2013/117997 A2 | 8/2013 |

OTHER PUBLICATIONS

Paxson, "End-to-End Internet Packet Dynamics," IEEE/ACM Transactions on Networking, vol. 7(3), pp. 277-292, 1999.
Appenzeller, et al., "Sizing router buffers," SIGCOMM, 2004.
Alizadeh, et al., "DCTCP: Efficient packet transport for the commoditized data center," SIGCOMM, 2010.
Mills, et al., "Network Time Protocol Version 4: Protocol and Algorithms Specification," Request for Comments: 5905, *Internet Engineering Task Force (IETF)*, Jun. 2010.
Zarick, et al., "The Impact of Network Latency on the Synchronization of Real-World IEEE 1588-2008 Devices," Proc. Of the 2010 Int'l IEEE Symposium on Precision Clock Synchronization for Measurement, Control and Communication, pp. 135-140, Sep. 27-Oct. 1, 2010.
Mukherjee, "On the Dynamics and Significance of Low Frequency Components of Internet D Load," Internetworking: Research and Experience. vol. 5. No. 4. pp. 163-205, 1994.
Abdul, et al., "Integration of HSR and IEEE1588 over Ethernet networks," Proc. of the 2010 Int'l IEEE Symposium on Precision Clock Synchronization for Measurement, Control and Communication, pp. 77-82, Sep. 27-Oct. 1, 2010.
Gurewitz, et al., "One-Way Delay Estimation Using Network Wide Measurements," IEEE Trans. on Information Theory, vol. 52, No. 6, pp. 2710-2724, 2006.
Gurewilz, et al., "Estimating One-Way Delays from Cyclic-Path Delay Measurements," Proc. of Twentieth Annual Joint Conf. of the IEEE Computer and Comm. Societies (IEEE INFOCOM 2001), vol. 2, pp. 1038-1044, 2001.
Lee, "An Enhanced IEEE 1588 Time Synchronization Algorithm for Asymmetric Communication Link Using Block Burst Transmission", IEEE Communications Letters, vol. 12, No. 9, pp. 687-689, Sep. 2008.
Lv, et al., "An Enhanced IEEE 1588 Time Synchronization for Asymmetric Communication Link in Packet Transport Network," IEEE Communications Letters, vol. 14. No. 8. pp. 764-766, Aug. 2010.
Simanic, et al., "Compensation of Asymmetrical Latency for Ethernet Clock Synchronization," Proc. of the 2011 Int'l IEEE Symposium on Precision Clock Synchronization for Measurement, Control and Communication (ISPCS), 2011, pp. 19-24, 2011.
Corlett, et al. "Statistics of One Way Internet Packet Delays", Internet Engineering Task Force, Aug. 2002, available at http://tools.ietf.org/id/draft-corlett-statistics-of-packet-delays-00.txt.
Zhang, et al., "PDV-based PTP LSP Setup, Reoptimization and Recovery," Internet Engineering Task Force, Oct. 2011.
Chin, et al., "IEEE 1588 Clock Synchronization using Dual Slave Clocks in a Slave," IEEE Communications Letters, vol. 13, No. 6, pp. 456-458, 2009.
Itu-T Recommendation G.8265.1/Y.1365.1, "Precision time protocol telecom profile for frequency synchronization," *Intl Telecommunication Union*, Oct. 2010.
IEEE Std. C37.238™—2011, "IEEE Standard Profile for Use of IEEE 1588™ Precision Time Protocol in Power System Applications," *Institute for Electrical and Electronics Engineers, Inc.*, Jul. 2011.
IEC 62439-3, "Industrial communication networks—High availability automation networks—Part 3: Parallel Redundancy Protocol (PRP) and High-availability Seamless Redundancy (HSR)," *International Electrotechnical Commission*, 2010.
Weber et al., "High availability seamless automation ring (Draft IEC 62439-3) and IEEE 1588 time sync dependencies," *Institute for Electrical and Electronics Engineers, Inc.*, Oct. 2010.
"ptpv2d Project Home Information," pp. 1-3, 2010.
"netem," Linux Foundation, Nov. 2009.
"Paragon-X," Calnex Solutions, 2010.
"Weighted mean," Wikipedia, pp. 1-10, last updated Feb. 2013.
Invitation to Pay Fees and Partial International Search Report in Corresponding PCT/IB2013/000633 Mailed Jul. 22, 2013.
Mills, D.L. "Internet Time Synchronization: The Network Time Protocol," Network Working Group Request for Comments, No. 1129, Oct. 1, 1989.
Shpiner et al., "Multi-Path Time Synchronization,"Internet Engineering Task Force, IETF, Standard Working Draft, Internet Society (ISOC) Geneva, Switzerland, Oct. 15, 2012.
IEEE Std 802.11e/D11.0, "IEEE Standard for Information technology—Telecommunications and information exchange between systems—Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements," *The Institute of Electrical and Electronics Engineers, Inc.*, Oct. 2004.
IEEE P802.1AS/D0.8, "Draft Standard for Local and Metropolitan Area Networks—Timing and Synchronization for Time-Sensitive Applications in Bridged Local Area Networks," *The Institute of Electrical and Electronics Engineers, Inc.*, May 25, 2007.
Abstract of IEEE 802.1AS Standard, "802.1AS—Timing and Synchronization," *The Institute of Electrical and Electronics Engineers, Inc.*, available at <http://www.ieee802.org/1/pages/802.1as.html>, (Nov. 11, 2010).
International Search Report in Int'l App. No. PCT/IB2013/001506, mailed Oct. 30, 2013.
Written Opinion in Int'l App. No. PCT/IB2013/001506, mailed Oct. 30, 2013.
Tournier et al., "Precise Time Synchronization on a High Available Redundant Ring Protocol," ISPCS 2009 International IEEE Symposium on Precision Clock Synchronization for Measurement, Control and Communication, Brescia, Italy, Oct. 12-16, 2009.
International Preliminary Report on Patentability for corresponding International Application No. PCT/IB2013/000633, dated Aug. 12, 2014 (12 pages).
Mills, D. "Internet Time Synchronization: The Network Time Protocol," Network Working Group Request for Comments, No. 1129, pp. 1-29 (Oct. 1989).
Office Action in U.S. Appl. No. 13/764,732, dated Aug. 29, 2014 (19 pages).
Augustin, Brice, et al., "Measuring Load-balanced Paths in the Internet," Internet Measurement Conference 2007 (IMC '07), San Diego, California, 12 pages (Oct. 2007).
Augustin, Brice, et al., Measuring Multipath Routing in the Internet, *IEEE/ACM Transactions on Networking*, Vo.. 19, No. 3, pp. 830-840 (Jun. 2011).
He, Yihua, et al., "On Routing Asymmetry in the Internet," *Global Telecommunications Conference 2005 (GLOBECOM '05)*, IEEE vol. 2, 7 pages (Nov. 2005).
Mills, David L., "Improved Algorithms for Synchronizing Computer Network Clocks 1,2," *Association for Computing Machinery*, 11 pages (1994).
Mizrahi, Tal, "Security Requirements of Time Synchronization Protocols in Packet Switched Networks," TICTOC Working Group, Internet Draft, 32 pages (Feb. 7, 2013).

(56) References Cited

OTHER PUBLICATIONS

Mizrahi, "Slave Diversity: Using Multiple Paths to Improve the Accuracy of Clock Synchronization Protocols," 2012 IEEE Int'l Symposium on Precision Clock Synchronization for Measurement, Control, and Communication (ISPCS), pp. 1-6 (Sep. 24, 2012).

Mizrahi, T., "A Game Theoretic Analysis of Delay Attacks against Time Synchronization Protocols," Precision Clock Synchronization for Measurement Control and Communication (SPCS), 2012 International IEEE Symposium, Sep. 24, 2012.

Narasimhan, Janardhanan, et al., "Traceflow," Internet Draft, 43 pages (Jan. 23, 2012).

Pathak, Abhinav, et al., A Measurement Study of Internet Delay Asymmetry, *Passive and Active Network Measurement, 9th International Conference, PAM 2008*, Cleveland, OH, 10 pages (Apr. 2008).

Notice of Allowance in U.S. Appl. No. 13/764,732, dated Jan. 7, 2015 (9 pages).

Notice of Allowance in U.S. Appl. No. 13/764,732, dated Jun. 25, 2015 (5 pages).

Office Action in U.S. Appl. No. 13/890,945, dated Oct. 30, 2014 (13 pages).

Notice of Allowance in U.S. Appl. No. 13/890,945, dated Apr. 8, 2015 (9 pages).

International Preliminary Report on Patentability in International Application No. PCT/IB2013/001506, dated Nov. 11, 2014 (6 pages).

International Search Report and Written Opinion in International Application No. PCT/IB2013/000633, dated Oct. 16, 2013 (18 pages).

U.S. Appl. No. 13/890,945, Mizrahi et al., "Clock Synchronization in the Presence of Security Threats," filed May 9, 2013.

\* cited by examiner

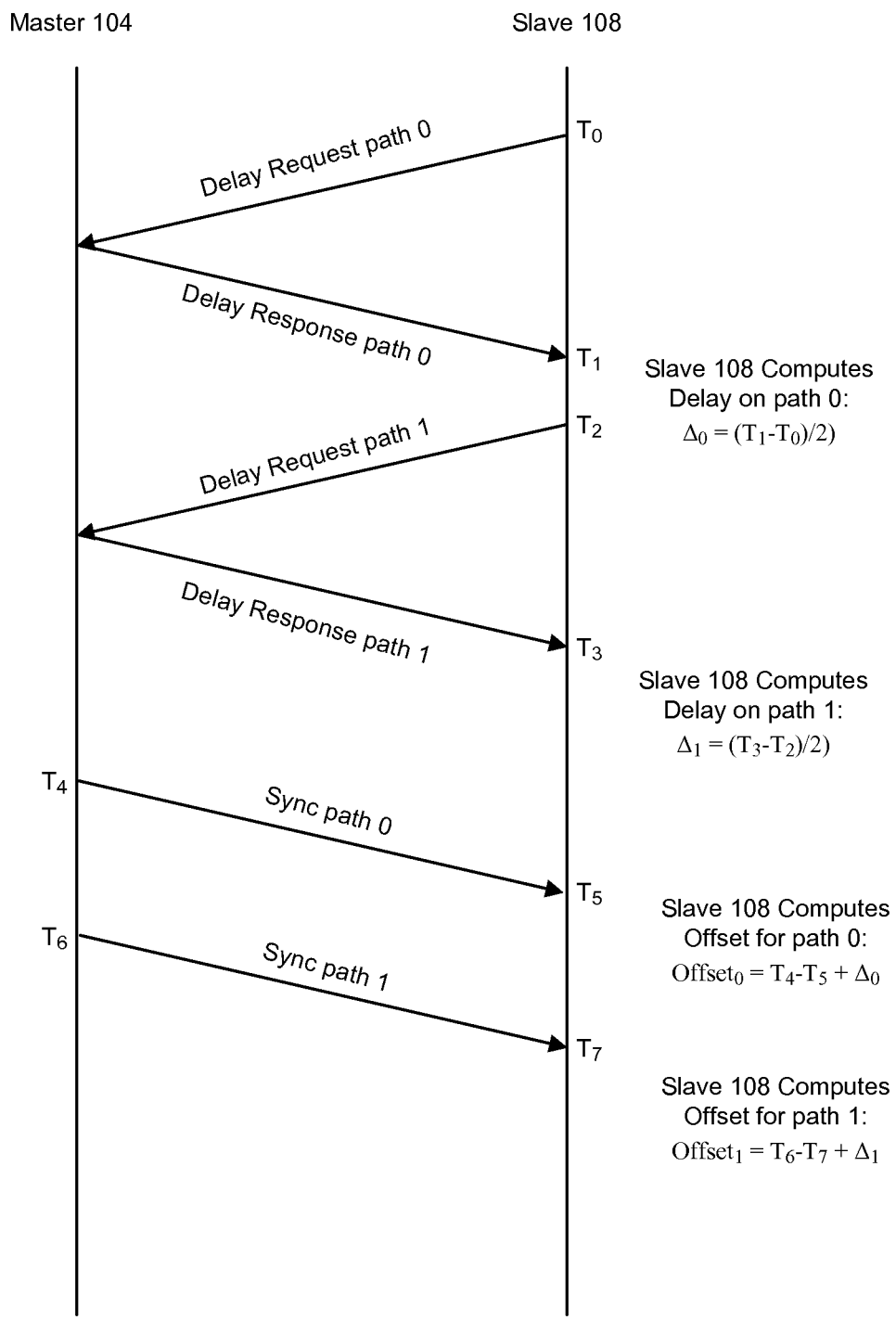

CLOCK SYNCHRONIZATION USING MULTIPLE NETWORK PATHS

CROSS-REFERENCES TO RELATED APPLICATIONS

This application is a continuation of U.S. patent application Ser. No. 13/764,732, entitled "Clock Synchronization Using Multiple Network Paths," filed on Feb. 11, 2013, which claims the benefit of:

U.S. Provisional Patent Application No. 61/597,092, entitled "Time Synchronization Diversity," filed on Feb. 9, 2012;

U.S. Provisional Patent Application No. 61/644,722, entitled "Slave Diversity: Using Multiple Paths to Improve the Accuracy of Clock Synchronization Protocols," filed on May 9, 2012;

U.S. Provisional Patent Application No. 61/647,123, entitled "Slave Diversity: Using Multiple Paths to Improve the Accuracy of Clock Synchronization Protocols," filed on May 15, 2012;

U.S. Provisional Patent Application No. 61/695,367, entitled "Multi-Path Time Protocols," filed on Aug. 31, 2012;

U.S. Provisional Patent Application No. 61/695,371, entitled "Multi-Masters Precision Time Protocols," filed on Aug. 31, 2012; and U.S. Provisional Patent Application No. 61/706,526, entitled "Multi-Path Time Protocols," filed on Sep. 27, 2012.

The disclosures of all of the above-referenced applications are incorporated herein by reference in their entireties.

FIELD OF THE DISCLOSURE

The present disclosure relates generally to devices that maintain a clock and, more particularly, to techniques for synchronizing clocks across a network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Clock synchronization protocols are commonly used in packet-based networks to synchronize clocks maintained at different network devices. In such clock synchronization protocols, a first network device, which maintains a master clock, transmits a protocol message including a master clock time to a second network device, which maintains a slave clock. The second network device utilizes the master clock time and an estimated network latency to adjust the slave clock in order to synchronize the slave clock with the master clock.

SUMMARY

In one embodiment, a network device comprises one or more ports to communicatively couple the network device to a master clock via a plurality of different communication paths, and a clock synchronization module configured to determine a plurality of path time data sets corresponding to the plurality of different communication paths based on signals received from the master clock via the plurality of different communication paths between the network device and the master clock. The network device also comprises a clock module configured to determine a time of day as a function of the plurality of path time data sets.

In various other embodiments, the network device comprises any combination of the following features.

The clock module is configured to determine the time of day based on a mathematical combination of at least two of the path time data sets.

The clock module is configured to determine the time of day based on an average of at least some of the path time data sets.

The network device further comprises a module configured to determine a plurality of respective measures of noisiness of the path time data sets; wherein the clock module is configured to eliminate, based on the plurality of respective measures of noisiness, one or more path time data sets from the determination of the time of day.

The clock module is configured to: determine path characteristics; determine, based on the path characteristics, whether to determine the time of day according to a first technique; when it is determined to determine the time of day according to the first technique, determine the time of day based on a mathematical combination of at least two of the path time data sets; determine, based on the path characteristics, whether to determine the time of day according to a second technique; when it is determined to determine the time of day according to the second technique, determine the time of day based on selecting one of the path time data sets based on the path characteristics.

The network device further comprises a path delay variability determination module configured to determine a plurality of respective measures of variability of path delays for ones of the plurality of different communication paths; wherein the clock module is configured to determine the time of day based on the plurality of respective measures of variability of path delays.

The clock module is configured to determine the time of day based on a weighted combination of the path time data sets, wherein each path time data set is weighted based on the corresponding measure of variability of path delay.

The clock module is configured to determine the time of day based on selecting one of the path time data sets using the plurality of respective measures of variability of path delays.

The path delay variability determination module comprises: a path delay calculator configured to determine a plurality of path delays corresponding to the plurality of different communication paths; and an average path delay calculator configured to calculate a plurality of average path delays corresponding to the plurality of different communication paths; wherein the path delay variability determination module is configured to calculate the plurality of respective measures of variability of path delays based on (i) the plurality of path delays, and (ii) the plurality of average path delays.

The plurality of path time data sets comprise a plurality of first clock offsets corresponding to the plurality of different communication paths; the clock synchronization module comprises a first offset calculator configured to calculate the plurality of first clock offsets based on the signals received from the master clock via the plurality of different communication paths; and the clock module comprises: a second offset calculator configured to determine a second clock offset using the first clock offsets, and a clock updater configured to determine the time of day based on (i) a current time of day and (ii) the second clock offset.

In another embodiment, a method includes receiving, at one or more ports of a network device, signals from a master clock, the signals from the master clock received via a plurality of different communication paths; determining, at the network device, a plurality of path time data sets corresponding to the plurality of different communication paths based on the signals from the master clock received via the plurality of different communication paths; and determining, at the network device, a time of day as a function of the plurality of path time data sets.

In various other embodiments, the method includes any combination of the following features.

Determining the time of day comprises determining a mathematical combination of at least two of the path time data sets.

Determining the time of day comprises determining an average of at least some of the path time data sets.

The method further includes determining a plurality of respective measures of noisiness of the path time data sets; and eliminating, based on the plurality of respective measures of noisiness, one or more path time data sets from the determination of the time of day.

The method further includes: determining path characteristics; determining, based on the path characteristics, whether to determine the time of day according to a first technique; when it is determined to determine the time of day according to the first technique, determining the time of day based on a mathematical combination of at least two of the path time data sets; determining, based on the path characteristics, whether to determine the time of day according to a second technique; when it is determined to determine the time of day according to the second technique, determining the time of day based on selecting one of the path time data sets based on the path characteristics.

The method further includes: determining a plurality of respective measures of variability of path delays for the plurality of different communication paths; and wherein the time of day is determined based on the plurality of respective measures of variability of path delays.

The time of day is determined based on a weighted combination of the path time data sets, wherein each path time data set is weighted based on the corresponding measure of variability of path delay.

The time of day is determined based on selecting one of the path time data sets using the plurality of respective measures of variability of path delays.

Determining the plurality of respective measures of variability of path delays for the plurality of different communication paths comprises: determining a plurality of path delays corresponding to the plurality of different communication paths; calculating a plurality of average path delays corresponding to the plurality of different communication paths; and calculating the plurality of respective measures of variability of path delays based on (i) the plurality of path delays, and (ii) the plurality of average path delays.

Determining the plurality of path time data sets comprises calculating a plurality of first clock offsets based on the signals received from the master clock via the plurality of different communication paths; determining the time of day comprises: determining a second clock offset using the first clock offsets, and determining the time of day based on (i) a current time of day and (ii) the second clock offset.

In another embodiment, a network device comprises one or more ports coupled to a network; and a path determination module configured to determine via which one of a plurality of communication paths in the network a packet from a master clock was received, wherein the packet is received via one of the one or more ports, and wherein the packet includes a time stamp from the master clock. The network device also comprises an application layer module configured to use (i) the time stamp in the packet and (ii) the determination of the communication path to determine time information.

In various other embodiments, the network device comprises any combination of the following features.

The path determination module is configured to determine the communication path via which the packet was received using a path identifier included in the packet.

The path determination module is configured to determine the communication path via which the packet was transmitted based on one or more Internet Protocol (IP) addresses in the packet.

The path determination module is configured to determine the communication path via which the packet was transmitted based on (i) a source IP address in the time stamped packet and (ii) a destination IP address in the time stamped packet.

The path determination module is configured to determine the communication path via which the packet was transmitted based on information in a header of the packet.

The path determination module is included in the application layer module.

The application layer module is configured to cause a plurality of requests to be transmitted to the master clock via the network, wherein the plurality of requests are configured to prompt the master clock to transmit a plurality of time-stamped packets, and wherein each request indicates a different communication path via which a corresponding one of the time-stamped packets in the plurality of packets is to be transmitted by the master clock.

In another embodiment, method includes receiving, via a port of a network device, a packet transmitted by a master clock via a network, wherein the packet includes a time stamp from the master clock; determining via which one of a plurality of communication path in the network the packet was received; and using, at an application layer module of the network device, (i) the time stamp in the packet and (ii) the determination of the communication path, to determine time information.

In various other embodiments, the method includes any combination of the following features.

Determining the communication path via which the packet was transmitted comprises analyzing a path identifier included in the packet.

Determining the communication path via which the packet was transmitted comprises determining the communication path based on one or more Internet Protocol (IP) addresses in the time stamped packet.

Determining the communication path via which the packet was transmitted comprises determining the communication path based on (i) a source IP address in the time stamped packet and (ii) a destination IP address in the time stamped packet.

Determining the communication path via which the packet was transmitted comprises determining the communication path based on information in a header of the packet.

The method further includes causing, with the application layer module, a plurality of requests to be transmitted to the master clock via the network, wherein the plurality of requests are configured to prompt the master clock to transmit the plurality of packets, and wherein each request indicates a different communication path via which a corresponding one of the packets in the plurality of packets is to be transmitted by the master clock.

In another embodiment, a network device comprises one or more ports coupled to a network; and a clock module configured to: associate multiple addresses with a master clock, and cause multiple time-stamped packets to be transmitted, the multiple time-stamped packets including the multiple addresses to cause the multiple packets to be transmitted via different paths in the network.

In various other embodiments, the network device comprises any combination of the following features.

The clock module is configured to: associate multiple IP addresses with the master clock, and include in the multiple time-stamped packets the multiple IP addresses.

The clock module is an application layer module.

The clock module is configured to operate at at least a fourth layer in a multi-layer protocol stack.

The clock module is configured to include in the multiple time-stamped packets the multiple slave IP addresses corresponding to a single slave clock.

In another embodiment, a method includes associating, at a first network device that implements a master clock, multiple addresses with the master clock; and transmitting multiple time-stamped packets to a second network device, the multiple time-stamped packets including the multiple addresses to cause the multiple packets to be transmitted via different paths in a network.

In various other embodiments, the method includes any combination of the following features.

Associating multiple addresses with the master clock comprises associating multiple IP addresses with the master clock; and the method further comprises including the multiple IP addresses in the multiple time-stamped packets.

Associating the multiple addresses with the master clock is performed by an application layer module in a communication device.

Associating the multiple addresses with the master clock is performed by a module operating at at least a fourth layer in a multi-layer protocol stack.

The method further comprises including in the multiple time-stamped packets multiple slave IP addresses corresponding to a single slave clock.

In another embodiment, a network device comprises one or more ports coupled to a network; and a clock module configured to: associate multiple addresses with a slave clock, and transmit multiple requests for multiple time-stamped packets to be received from a master clock via different paths in the network, the multiple requests including the multiple addresses of the slave clock.

In various other embodiments, the network device comprises any combination of the following features.

The clock module is configured to: associate multiple IP addresses with the slave clock, and include in the multiple time-stamped packets the multiple IP addresses.

The clock module is an application layer module.

The clock module is configured to operate at at least a fourth layer in a multi-layer protocol stack.

The clock module is configured to include in the multiple requests multiple master IP addresses corresponding to a single master clock.

In another embodiment, a method includes associating, at a first network device that implements a slave clock, multiple addresses with the slave clock; and transmitting multiple requests to a second network device, the multiple requests including the multiple addresses to cause the multiple time-stamped packets to be received from the second network device via different paths in a network.

In various other embodiments, the method includes any combination of the following features.

Associating multiple addresses with the slave clock comprises associating multiple IP addresses with the slave clock; and the method further comprises including the multiple IP addresses in the multiple requests.

Associating the multiple addresses with the slave clock is performed at an application layer.

Associating the multiple addresses with the slave clock is performed by a module operating at at least a fourth layer in a multi-layer protocol stack.

The method further comprises including in the multiple requests multiple master IP addresses corresponding to a single master clock.

BRIEF DESCRIPTION OF THE DRAWINGS

FIG. 3 is a timing diagram illustrating signals exchanged via multiple paths between a slave clock and a master clock, according to an embodiment.

DETAILED DESCRIPTION

Figure 1:
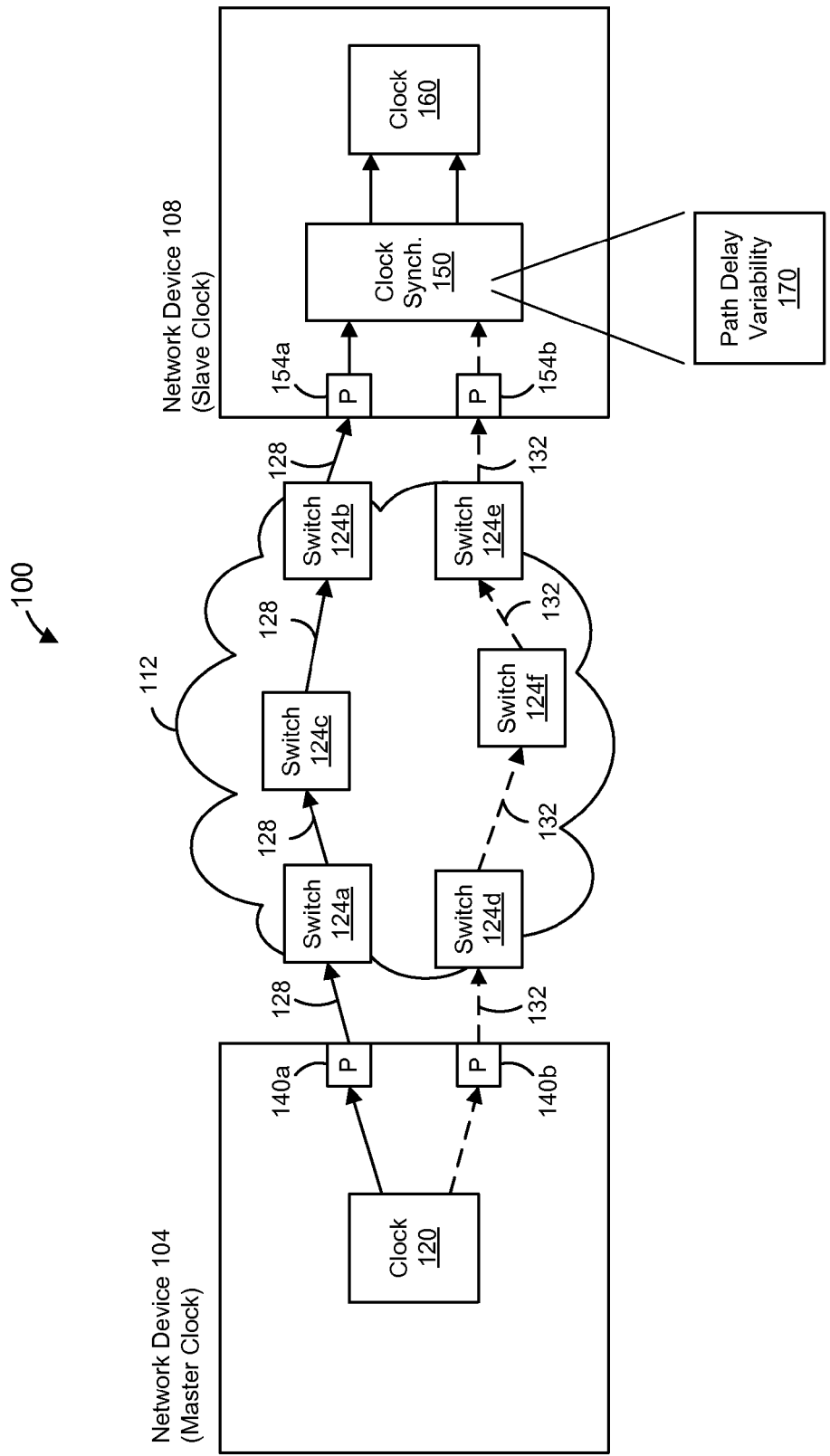
FIG. 1 is a block diagram of an example system in which a slave clock is maintained based on a master clock and based on signals transmitted by the master clock via multiple paths in a network, according to an embodiment.

FIG. 1 is a block diagram of an example system 100, according to an embodiment, having a first network device 104 communicatively coupled to a second network device 108 via a communication network 112. The first network device 104 implements a master clock, and the first network device 104 is sometimes referred to herein as the master clock device 104. The second network device 108 implements a slave clock, and the second network device 108 is sometimes referred to herein as the slave clock device 108.

The master clock device 104 includes a clock module 120 configured to maintain the master clock. In an embodiment, the master clock is a time-of-day clock. In another embodiment, the master clock is a counter not directly linked to a time-of-day. In an embodiment, the clock module 120 includes or utilizes a counter circuit that maintains the master clock. In an embodiment, the clock module 120 is an application layer module operating at an application layer in a multi-layer communication protocol stack. In an embodiment, the multi-layer communication protocol stack (e.g., the Transport Control Protocol/Internet Protocol (TCP/IP) protocol suite) comprises a link layer, an Internet layer, a transport layer, and the application layer, where the application layer is above the transport layer, the Internet layer, and the link layer in the protocol stack. In another embodiment, the multi-layer communication protocol stack (e.g., corresponding to the Open Systems Interconnection (OSI) model) comprises a physical layer, a data link layer, a network layer, a transport layer, a session layer, a presentation layer, and the application layer, where the application layer is above the presentation layer, the session layer, the transport layer, the network layer, the data link layer, and the physical layer in the protocol stack. In other embodiments, the clock module 120 operates at another suitable layer at least at a fourth layer in a multi-layer communication protocol stack.

The clock module 120 is configured to cause a plurality of time-stamped packets to be transmitted from the master clock device 104 to the slave clock device 108 via respective different communication paths through the network 112. The plurality of time-stamped packets are time-stamped with one or more values of the master clock maintained by the clock module 120, in an embodiment.

The network 112 comprises one or more of a private network, a public network, a backbone network, a provider network, the Internet, etc. The network 112 comprises a plurality of network switches and/or routers 124 (referred to hereinafter as switches merely for brevity), in an embodiment, and a first path 128 corresponds to a link from the switch 124*a* to the switch 124*b* via the switch 124*c*. A second path 132 corresponds to a link from the switch 124*d* to the switch 124*e* via the switch 124*f*.

The clock module 120 is configured to cause a first time-stamped packet to be transmitted from the master clock device 104 to the slave clock device 108 via the path 128, and to cause a second time-stamped packet to be transmitted from the master clock device 104 to the slave clock device 108 via the path 132. In an embodiment, the master clock device 104 includes multiple ports 140, and the clock module 120 is configured to cause the first time-stamped packet to be transmitted via the port 140*a* and the second time-stamped packet to be transmitted via the port 140*b*. In other embodiments and/or scenarios, each of at least some of the time-stamped packets are transmitted via the same port 140. Although two ports 140 are illustrated in FIG. 1, in other embodiments, the master clock device 104 includes a suitable number of ports 140 greater than two. In one embodiment, the master clock device 104 includes only a single port 140, and path diversity is entirely provided by the network 112. For example, in locally administered networks 112, switches/routers can be configured to utilize different paths when transmitting packets destined for the same endpoint device but including different header information (e.g., source addresses, destination addresses, Layer 4 ports, etc.), in some embodiments. As another example, public and/or provider networks, at least some switches/routers in the network 112 apply load balancing techniques in which packets destined for the same endpoint device are directed along different paths based upon different header information in the packets (e.g., source addresses, destination addresses, Layer 4 ports, etc.), in some embodiments. Thus, to cause the network 112 to transmit packets to the slave clock device 108 via different paths, the master clock device 104 varies header information in the packets (e.g., source addresses, destination addresses, Layer 4 ports, etc.), in some embodiments.

A clock synchronization module 150 of the slave clock device 108 is configured to determine different clock results corresponding to the plurality of time-stamped packets transmitted by the master clock device 104, and corresponding to the plurality of different communication paths through the network 112. For example, the clock synchronization module 150 is configured to determine a first clock result corresponding to the first time-stamped packet transmitted via the first path 128, and a second clock result corresponding to the second time-stamped packet transmitted via the second path 132. In an embodiment, the slave clock device 108 includes multiple ports 154, and the first time-stamped packet is received via the port 154*a* and the second time-stamped packet is received via the port 154*b*. In other embodiments and/or scenarios, each of at least some of the time-stamped packets are received via the same port 154. Although two ports 154 are illustrated in FIG. 1, in other embodiments, the slave clock device 108 includes a suitable number of ports 154 greater than two. In an embodiment, the slave clock device 108 includes only a single port 154.

The clock synchronization module 150 is configured to determine each clock result based on a respective time stamp in the respective time-stamped packet transmitted via the respective path. In an embodiment, each clock result generated by the clock synchronization module comprises an offset between the master clock maintained at the master clock device 104 and a slave clock maintained at the slave clock device 108. For example, the clock synchronization module 150 is configured to determine each offset based on (i) the respective time stamp in the respective time-stamped packet transmitted via the respective path, and (ii) a value of the slave clock at a respective time at which the respective time-stamped packet was received by the slave clock device 108, in an embodiment. As an illustrative example, in an embodiment, the clock synchronization module 150 determines a first offset based on (i) a first time stamp in the first time-stamped packet transmitted via the first path 128, and (ii) a first value of the slave clock at a first time at which the first time-stamped packet was received by the slave clock device 108; and the clock synchronization module 150 determines a second offset based on (i) a second time stamp in the second time-stamped packet transmitted via the second path 132, and (ii) a second value of the slave clock at a second time at which the second time-stamped packet was received by the slave clock device 108.

In another embodiment, each clock result generated by the clock synchronization module 150 comprises a clock value (e.g., a time-of-day value) corresponding to the master clock maintained at the master clock device 104. For example, the clock synchronization module 150 is configured to determine each clock value based on the respective time stamp in the respective time-stamped packet transmitted via the respective path, in an embodiment. As an illustrative example, in an embodiment, the clock synchronization module 150 determines a first clock value based on the first time stamp in the first time-stamped packet transmitted via the first path 128, and determines a second clock value based on the second time stamp in the second time-stamped packet transmitted via the second path 132. In an embodiment, the clock synchronization module 150 is an application layer module operating at the application layer in the multi-layer communication protocol stack. In other embodiments, the clock synchronization module 150 operates at another suitable layer at least at a fourth layer in a multi-layer communication protocol stack. In other embodiments, the clock synchronization module 150 is at another suitable layer below an application layer and/or operates at a suitable layer below the fourth layer in the multi-layer communication protocol stack.

As will be described in more detail below, the clock synchronization module 150 is configured to maintain, for each path, a respective path time data set that includes a respective path-dependent clock, or information for generating the respective clock result such as a respective path delay measurement, a respective clock offset, etc., in some embodiments. In some embodiments, the clock synchronization module 150 uses the path time data sets to generate the clock results. In other embodiments, the clock results are the path time data sets or are included in the path time data sets. In some embodiments in which the clock synchronization module 150 is configured to maintain respective path-dependent clocks, the clock synchronization module 150 includes or utilizes respective counter circuits that maintain the different path-dependent clocks.

A clock module 160 in the slave clock device 108 is configured to maintain the slave clock, in some embodiments. In an embodiment, the slave clock is a time-of-day clock. In another embodiment, the slave clock is a counter not directly linked to a time-of-day. In an embodiment, the clock module 160 includes or utilizes a counter circuit that maintains the slave clock. In an embodiment, the clock module 160 is an application layer module operating at the application layer in the multi-layer communication protocol stack. In other embodiments, the clock module 160 operates at another suitable layer at least at a fourth layer in a multi-layer communication protocol stack. In some embodiments in which the clock synchronization module 150 is configured to maintain respective path-dependent clocks, the clock module 160 is configured to select one of the path-dependent clocks as the slave clock rather than maintaining a separate slave clock.

The clock module 160 is configured to determine the slave clock value using the plurality of clock results generated by the clock synchronization module 150, in some embodiments. In an embodiment, the clock module 160 is configured to determine the slave clock value at least by mathematically combining the plurality of clock results generated by the clock synchronization module 150. In another embodiment, the clock module 160 is configured to determine the slave clock value at least by selecting one of the plurality of clock results generated by the clock synchronization module 150. For example, one of the clock results is determined to be most accurate based on independently determined accuracy metrics for each path such as path length, path delay variability (or noisiness) etc., in some embodiments. In another embodiment, the clock module 160 is configured to determine the slave clock value at least by (i) combining at least some of the plurality of clock results generated by the clock synchronization module 150 in some situations, and (ii) selecting one of the plurality of clock results generated by the clock synchronization module 150 in other situations. In another embodiment, the clock module 160 is configured to determine the slave clock value at least by (i) selecting a subset of the plurality of clock results generated by the clock synchronization module 150, and (ii) combining the subset of clock results. For example, the selected subset is the clock result(s) that are determined to be suitably accurate based on independently determined accuracy metrics for each path such as path length, path delay variability (or noisiness) etc., in some embodiments.

In some embodiments in which the clock results generated by the clock synchronization module 150 comprise offsets, the clock module 160 is configured to determine the slave clock value at least by mathematically combining two or more of the plurality of offsets to generate a combined offset, and then use the combined offset to set the slave clock value. In some embodiments in which the clock results generated by the clock synchronization module 150 comprise offsets, the clock module 160 is configured to select one of the plurality of offsets, and then use the selected offset to set the slave clock value. For example, one of the offsets is determined to be most accurate based on independently determined accuracy metrics for each path such as path length, path delay variability (or noisiness) etc., in some embodiments. In some embodiments in which the clock results generated by the clock synchronization module 150 comprise offsets, the clock module 160 is configured to, (i) in some situations, mathematically combine the plurality of offsets to generate the combined offset, and then use the combined offset to set the slave clock value, and (ii) in other situations, select one of the plurality of offsets, and then use the selected offset to set the slave clock value. In an embodiment, the clock module 160 is configured to determine the slave clock value at least by (i) selecting a subset of the plurality offsets, and (ii) combining the subset of offsets. For example, the selected subset is the offset(s) that are determined to be suitably accurate based on independently determined accuracy metrics for each path such as path length, path delay variability (or noisiness) etc., in some embodiments.

In some embodiments in which the clock results generated by the clock synchronization module 150 comprise different clock values corresponding to different paths (path clock values), the clock module 160 is configured to determine the slave clock value at least by mathematically combining two or more of the different path clock values to generate a combined clock value, and then use the combined clock value to set the slave clock value. In some embodiments in which the clock results generated by the clock synchronization module 150 comprise path clock values, the clock module 160 is configured to select one of the path clock values, and then use the selected path clock value to set the slave clock value. For example, one of the clock values is determined to be most accurate based on independently determined accuracy metrics for each path such as path length, path delay variability (or noisiness) etc., in some embodiments. In some embodiments in which the clock results generated by the clock synchronization module 150 comprise path clock values, the clock module 160 is configured to, (i) in some situations, mathematically combine at least some of the path clock values to generate the combined clock value, and then use the combined clock value to set the slave clock value, and (ii) in other situations, select one of the path clock values, and then use the selected path clock value to set the slave clock value.

In an embodiment, the clock module 160 is configured to calculate an average of at least some of the clock results generated by the clock synchronization module 150, and to determine the slave clock value based on the average clock result. In some embodiments in which the clock results generated by the clock synchronization module 150 comprise offsets, the clock module 160 is configured to calculate an average of at least some of the offsets, and to determine the slave clock value based on the average offset. In some embodiments in which the clock results generated by the clock synchronization module 150 comprise different clock values corresponding to different paths (path clock values), the clock module 160 is configured to calculate an average of at least some of the path clock values, and to determine the slave clock value based on the average clock value. In an embodiment, the clock module 160 is configured to determine the slave clock value at least by (i) selecting a subset of the plurality path clock values, and (ii) combining the subset of path clock values. For example, the selected subset is the path clock value(s) that are determined to be suitably accurate based on independently determined accuracy metrics for each path such as path length, path delay variability (or noisiness) etc., in some embodiments.

In some embodiments, the clock module 160 is configured to calculate a weighted average of at least some of the clock results. In an embodiment, weights utilized in calculating the weighted average are determined based on independently determined accuracy metrics for each path such as path length, path delay variability (or noisiness) etc. For example, relatively lesser weight is given to a path with a relatively longer length, whereas relatively greater weight is given to a path with a relatively shorter length, in an embodiment. As another example, relatively lesser weight is given to a path with a relatively higher variability (or noisiness) in path delay, whereas relatively greater weight is given to a path with a relatively lower variability (or noisiness) in path delay, in an embodiment.

For example, in an embodiment, the clock synchronization module 150 includes a path delay variability determination module 170 configured to generate respective measures of path delay variability for the different paths through the network 112. In an embodiment, the clock synchronization module 150 is configured to utilize the measures of path delay variability for the different paths through the network 112 to determine the different weights utilized in calculating the weighted average. For example, relatively lesser weight is given to a path with a relatively higher variability (or noisiness) in path delay, whereas relatively greater weight is given to a path with a relatively lower variability (or noisiness) in path delay, in an embodiment.

In an embodiment, the path delay variability determination module 170 is configured to generate respective path delay measures for the different paths through the network 112. In an embodiment, each path delay measure is a measure of a one-way delay from the master clock device 104 to the slave clock device 108 via the respective path. In an embodiment, the path delay variability determination module 170 is configured to generate, for each path, the one-way delay by (i) determining a round-trip delay from the slave clock device 108 to the master clock device 104 and back to the slave clock device 108 via the respective path, and (ii) calculating the one-way delay based on the round trip delay. In an embodiment, the one-way delay is calculated as one half of the round-trip delay.

In an embodiment, the path delay variability determination module 170 is configured to generate respective average path delays for the different paths through the network 112. In an embodiment, the path delay variability determination module 170 is configured to generate, for each path, the respective measure of path delay variability based on the respective average path delay and a respective recent (e.g., most recent) path delay measure. In an embodiment, the path delay variability determination module 170 is configured to generate, for each path, the respective measure of path delay variability based on calculating a difference between the respective average path delay and the respective recent (e.g., most recent) path delay measure. The magnitude of the difference calculated for a path generally indicates a degree of variability in the path delay for the path, in an embodiment. For example, if a magnitude of a first difference calculated for a first path is greater than a magnitude of a second difference calculated for a second path, it is assumed that the path delay in the first path has a greater degree of variability than the path delay in the second path, in an embodiment.

In some embodiments in which the clock results generated by the clock synchronization module 150 comprise offsets, the clock module 160 is configured to select one of the offsets based on measures of path delay variability for the different paths, and then use the selected offset to set the slave clock value. For example, in an embodiment, the clock module 160 is configured to select an offset corresponding to a path with a lowest measure of path delay variability, and then use the selected offset to set the slave clock value.

In some embodiments in which the clock results generated by the clock synchronization module 150 comprise offsets, the clock module 160 is configured to select a set of the offsets that are each associated with a measure of path delay variability that meets one or more criteria, and to determine an offset using the set of selected offsets. For example, in an embodiment, the clock module 160 is configured to select a set of the offsets that are each associated with a measure of path delay variability that meets a threshold (e.g., is less than the threshold, is less than or equal to the threshold, etc.), and to determine an offset using the set of selected offsets. For example, in an embodiment, if there are multiple offsets in the set, the clock module 160 is configured to calculate an average of the selected offsets, and to determine the slave clock value using the average offset. In an embodiment, paths with high variability are not considered when calculating the average such that only paths with a measured variability less than a suitable variability threshold are used when calculating the average. In an embodiment, if there is only one path with a measured variability less than the suitable variability threshold, the corresponding one offset is used to set the slave clock value (i.e., an average of multiple offsets is not calculated). In other words, in an embodiment, if there is only one offset in the set, the clock module 160 is configured to set the slave clock using the selected offset.

In some embodiments in which the clock results generated by the clock synchronization module 150 comprise different clock values corresponding to different paths (path clock values), the clock module 160 is configured to select one of the path clock values based on measures of path delay variability for the different paths, and then use the selected path clock value to set the slave clock value. For example, in an embodiment, the clock module 160 is configured to select a path clock value corresponding to a path with a lowest measure of path delay variability, and then use the selected path clock value to set the slave clock value.

In some embodiments in which the clock results generated by the clock synchronization module 150 comprise different clock values corresponding to different paths (path clock values), the clock module 160 is configured to select a set of the path clock values that are each associated with a measure of path delay variability that meets one or more criteria, and to determine an average path clock value using the set of selected path clock values. For example, in an embodiment, the clock module 160 is configured to select a set of the path clock values that are each associated with a measure of path delay variability that meets a threshold (e.g., is less than the threshold, is less than or equal to the threshold, etc.), and to determine slave clock value using the set of selected path clock values. For example, in an embodiment, if there are multiple path clock values in the set, the clock module 160 is configured to calculate an average of the selected path clock values, and to determine the slave clock value using the average path clock value. As another example, in an embodiment, if there is only one path clock value in the set, the clock module 160 is configured to set the slave clock using the selected path clock value.

In some embodiments, the clock synchronization module 150 is configured to measure respective path characteristics for each path such as path length, path delay variability (or noisiness), etc., and/or measured characteristics of respective path clock values, such as degree of jitter. In an embodiment, the path length is measured in terms of a number of hops. For example, in some embodiments, Traceroute-based path discovery techniques are utilized to determine the number of hops in a path. In some embodiments, the clock synchronization module 150 is configured to measure respective path characteristics for each path such as path length, path delay variability (or noisiness), etc., and/or measured characteristics of respective path clock values, such as degree of jitter.

Figure 2A:
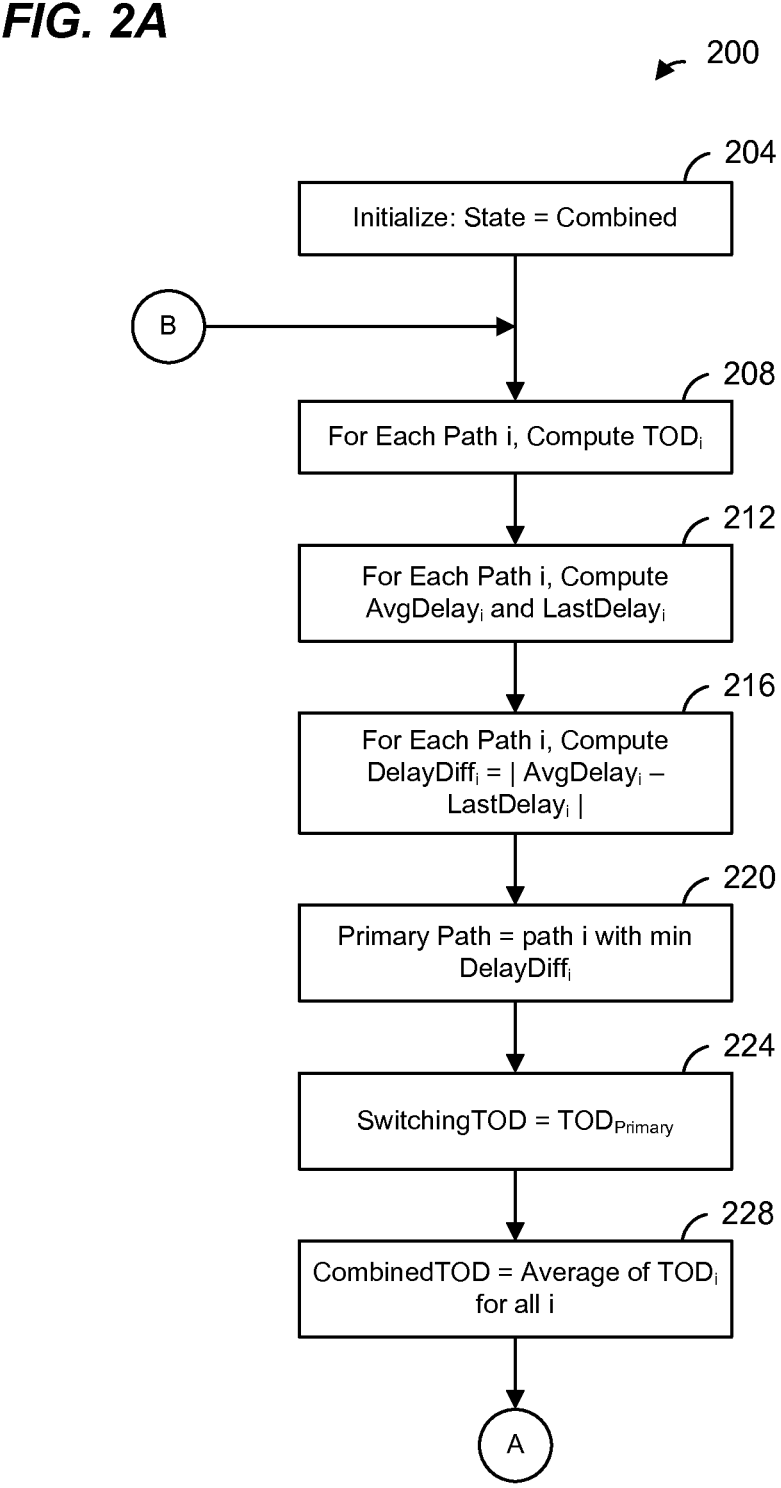
FIGS. 2A and 2B are a flow diagram of an example method for maintaining a slave clock using multiple clock signals received from a master clock via multiple paths in a network, according to an embodiment.
Figure 2B:
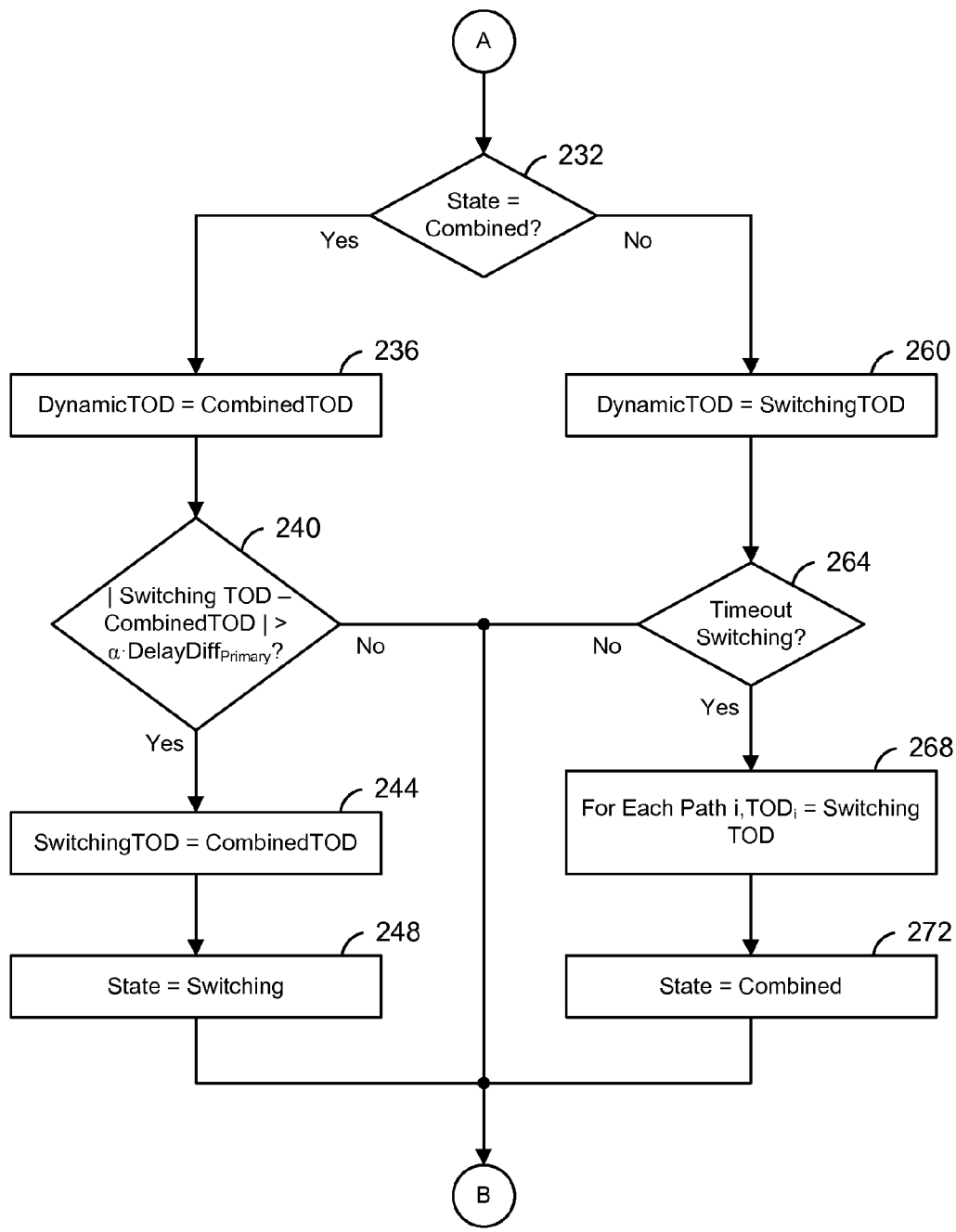

FIGS. 2A and 2B are a flow diagram of an example method 200 for maintaining a slave clock using multiple clock signals received from a master clock via multiple paths in a network, according to an embodiment. The slave clock device 108 of FIG. 1 is configured to implement the method 200, in an embodiment, and the method 200 is discussed with reference to FIG. 1 for explanatory purposes. In other embodiments, however, the method 200 is implemented by another suitable device.

At block 204, a state variable is initialized to a value COMBINED. The state variable generally indicates how the slave clock is to be set. For example, when the state variable is a value COMBINED, the slave clock is to be set according to a first technique (as described below), and when the state variable is a value SWITCHING, the slave clock is to be set according to a second technique (as described below), in an embodiment.

At block 208, a respective clock (e.g., a respective time of day clock ($TOD_i$)) is determined for each of a plurality of paths via which clock signals are received from the master clock device 104. For example, a $TOD_1$ is determined for clock signals from the master clock device 104 received via path 128, and $TOD_2$ is determined for clock signals from the master clock device 104 received via path 132. Block 208 comprises determining a respective $TOD_i$ each time a clock signal from the master clock is received via the respective path i, in an embodiment.

At block 212, a most recent measure of a delay from the master clock device 104 to the slave clock device 108 via the path i ($LastDelay_i$) is determined for each path i. For example, in order to measure the LastDelay for the i-th path, the slave clock device 108 transmits a path delay measurement packet (e.g., an Internet Control Message Protocol (ICMP) echo request packet) to the master clock device 104, which prompts the master clock device 104 to immediately transmit a response packet (e.g., an ICMP response) to the slave clock device 108 via the path i, in an embodiment. The slave clock device 108 then measures the round-trip delay corresponding to the path i based on when the ICMP echo request packet was transmitted and when the ICMP response was received via the path i, and determines the LastDelay, as one half the round-trip delay, in an embodiment. Such measurements are made periodically, according to a schedule, etc., in various embodiments.

Also at block 212, an average delay from the master clock device 104 to the slave clock device 108 via the path i ($AvgDelay_i$) is determined for each path i. For example, the $AvgDelay_i$ is calculated by averaging multiple $LastDelay_i$ values over time, in an embodiment. As each LastDelay, for the i-th path is calculated, the $AvgDelay_i$ is updated with the new $LastDelay_i$ value, in an embodiment.

At block 216, respective measures of path delay variability for the different paths are calculated. For example, an absolute value of the difference ($DelayDiff_i$) between the $AvgDelay_i$ and the $LastDelay_i$ is calculated for each path i, in an embodiment. For example, a larger $DelayDiff_i$ indicates relatively more variability as compared to a smaller $DelayDiff_i$, in an embodiment. As each $LastDelay_i$ for the i-th path is calculated, the $AvgDelay_i$ is updated, as discussed above, and then a new $DelayDiff_i$ is calculated, in an embodiment.

In some embodiments, the respective measures of path delay variability for the different paths also provide a measure of noisiness of the respective $TOD_i$'s. For example, as the path delay variability for the i-th path increases, jitter (or noisiness) of the TOD for the i-th path will also increase, in an embodiment. In other embodiments, respective measures of noisiness of the respective $TOD_i$'s are determined by analyzing the respective $TOD_i$'s over time.

At block 220, a primary path is selected as the path with the lowest measure of path delay variability. For example, the primary path is selected as the paths with the lowest $DelayDiff_i$. In other embodiments, the primary path is selected based on one or more suitable measured characteristics of the individual TODs, such as degree of jitter.

At block 224, a first TOD (SwitchingTOD) is set to the $TOD_i$ (determined at block 208) corresponding to the primary path (determined at block 220). As will be explained below, the SwitchingTOD is used when the state variable is set to SWITCHING. The SwitchingTOD corresponds to the $TOD_i$ of the path with the lowest measure of path delay variability, in an embodiment. In other embodiments, the SwitchingTOD corresponds to the TOD, of a path selected based on measured characteristics of the individual TODs, such as degree of jitter.

At block 228, a second TOD (CombinedTOD) is set to an average of the $TOD_i$'s for all of the paths (determined at block 208). As will be explained below, the CombinedTOD is used when the state variable is set to COMBINED. In an embodiment, block 228 comprises calculating a weighted average. In an embodiment, weights for calculating the weighted average are determined based on the $DelayDiff_i$ values calculated at block 216. Thus, in some embodiments, the weights for calculating the weighted average are configurable and are determined based on measured path characteristics such as path length, path delay variability (or noisiness), etc., and/or measured characteristics of the individual TODs, such as degree of jitter.

At block 232, it is determined whether the state variable is set to COMBINED. If it is determined that the state variable is set to COMBINED, the flow proceeds to block 236. At block 236, the slave clock (DynamicTOD) is set to the CombinedTOD determined at block 228.

At block 240, the absolute value of a difference between the SwitchingTOD and the CombinedTOD is compared to a threshold. In an embodiment, the threshold is the DelayDiff of the primary path multiplied by a suitable scalar α. If it is determined that the absolute value of the difference between the SwitchingTOD and the CombinedTOD does not meet the threshold (e.g., is less than or equal to the threshold), the state variable remains set to COMBINED, and the flow returns to block 208.

On the other hand, if it is determined at block 240 that the absolute value of the difference between the SwitchingTOD and the CombinedTOD meets the threshold (e.g., is greater than the threshold), this may indicate that the path delay variability in one or more of the paths has increased, and the flow proceeds to block 244. At block 244, the SwitchingTOD is set to the CombinedTOD. In an embodiment, block 244 helps ensure continuity of the DynamicTOD. At block 248, the state variable is set to SWITCHING. In an embodiment, the state variable is set to SWITCHING because the comparison at block 240 indicates that path delay variability in one or more of the paths has increased, which may adversely impact the CombinedTOD. After block 248, the flow returns to block 208.

Referring again to block 232, if it is determined that the state variable has the value SWITCHING, in an embodiment, the flow proceeds to block 260. At block 260, the slave clock (DynamicTOD) is set to the SwitchingTOD determined at block 224.

At block 264, it is determined whether the state variable has been set to the value SWITCHING at least for a timeout period. If it is determined that the state variable has been set to the value SWITCHING for less than the timeout period, in an embodiment, the state variable remains set to SWITCHING, and the flow returns to block 208.

On the other hand, if it is determined that the state variable has been set to the value SWITCHING for at least the timeout period, in an embodiment, the flow proceeds to block 268. At block 268, the TOD$_i$ for each path i is set to the Switching-TOD. In an embodiment, block 268 helps ensure continuity of the DynamicTOD. At block 272, the state variable is set to COMBINED. After block 272, the flow returns to block 208.

In some embodiments, the TOD$_i$ for each path i, the SwitchingTOD, and the CombinedTOD are calculated offsets between the master clock and the slave clock. In an embodiment, the slave clock (DynamicTOD) is updated using either the CombinedTOD offset (block 236) or the SwitchingTOD offset (block 260). For example, the slave clock is updated by adding the offset to a current value of the slave clock, in an embodiment.

FIG. 3 is a timing diagram 300 illustrating signals exchanged between the slave clock device 108 and the master clock device 104 as part of an example of maintaining the slave clock, according to an embodiment. The scenario illustrated in FIG. 3 involves two different paths in the network 112: path 0 and path 1. In other scenarios, a suitable number of paths greater than two are utilized, at least in some embodiments.

At time T$_0$, the slave clock device 108 transmits a first path delay measurement packet (e.g., ICMP echo request packet) to the master clock device 104, prompting the master clock device 104 to immediately transmit a first response packet (e.g., an ICMP response) to the slave clock device 108 via the path 0, in an embodiment. At time T$_1$, the first response packet (e.g., an ICMP response) transmitted by the master clock device 104 via the path 0 is received at the slave clock device 108, in an embodiment.

After time T$_1$, the slave clock device 108 calculates a delay on path 0 (A0 as one half of the round trip delay:

$$\Delta_0 = (T_1 - T_0)/2. \quad \text{(Equation 1)}$$

At time T$_2$, the slave clock device 108 transmits a second path delay measurement packet (e.g., ICMP echo request packet) to the master clock device 104, prompting the master clock device 104 to immediately transmit a second response packet (e.g., an ICMP response) to the slave clock device 108 via the path 1, in an embodiment. At time T$_3$, the second response packet (e.g., an ICMP response) transmitted by the master clock device 104 via the path 1 is received at the slave clock device 108, in an embodiment.

After time T$_3$, the slave clock device 108 calculates a delay on path 1 ($\Delta_1$) as one half of the round trip delay:

$$\Delta_1 = (T_3 - T_2)/2. \quad \text{(Equation 2)}$$

At time T$_4$, the master clock device 104 transmits a first time-stamped packet to the slave clock device 108 via the path 0. In an embodiment, the first time-stamped packet includes a time stamp equal to (or substantially equal to) a value corresponding to time T$_4$. At time T$_5$, the slave clock device 108 receives the first time-stamped packet via the path 0. After time T$_5$, the slave clock device 108 computes a clock offset corresponding to path 0 based on the first time-stamped packet and the calculated delay on path 0 ($\Delta_0$). In an embodiment, the clock offset corresponding to path 0 (Offset$_0$) is calculated according to:

$$\text{Offset}_0 = T_4 - T_5 + \Delta_0 \quad \text{(Equation 3)}$$

At time T$_6$, the master clock device 104 transmits a second time-stamped packet to the slave clock device 108 via the path 1. In an embodiment, the second time-stamped packet includes a time stamp equal to (or substantially equal to) a value corresponding to time T$_6$. At time T$_7$, the slave clock device 108 receives the second time-stamped packet via the path 1. After time T$_7$, the slave clock device 108 computes a clock offset corresponding to path 1 based on the second time-stamped packet and the calculated delay on path 1 ($\Delta_1$). In an embodiment, the clock offset corresponding to path 1 (Offset$_1$) is calculated according to:

$$\text{Offset}_1 = T_6 - T_7 + \Delta_1 \quad \text{(Equation 4)}$$

The slave clock is then updated using the clock offset corresponding to path 0 and the clock offset corresponding to path 1. For example, the slave clock is then updated using the clock offset corresponding to path 0 and the clock offset corresponding to path 1 according to techniques such as described above (e.g., computing an average of the path 0 offset and the path 1 offset, selecting one of the path 0 offset and the path 1 offset based on path delay variability, etc.).

As discussed above, various packets are transmitted between the master clock device 104 and the slave clock device 108 via different paths through the network 112. The master clock device 104 and slave clock device 108 each should be able to determine the path via which packets are to travel after transmission, and to identify the path via which packets are received. Various techniques for configuring, identifying, specifying, utilizing, etc., different paths through the network 112 will now be described.

At least some of the techniques for specifying and/or utilizing different paths involve assigning different addresses (e.g., IP addresses) to the master clock and/or assigning different addresses (e.g., IP addresses) to the slave clock, wherein different addresses and/or different pairs of addresses correspond to different paths through the network 112.

In locally administered networks 112, switches/routers can be configured to utilize different paths when transmitting packets destined for the same endpoint device but including different address information (e.g., source addresses and/or destination addresses), in an embodiment. For example, the routing/forwarding tables across the network can be configured with multiple traffic engineered paths between the master clock and the slave clock. By configuring the routers/switches in such networks diverse paths are created for transmission of packets between the master clock and the slave clock.

On the other hand, in other types of networks, such as public and provider networks, it not possible or practical to configure switches/routers to provide different paths. In some networks 112, at least some switches/routers in the network 112 apply load balancing techniques in which packets destined for the same endpoint device are directed along different paths, in some embodiments. To utilize load balancing capabilities of such switches/routers when transmitting a packet to the slave clock device 108, the master clock device 104, for example, uses different addresses (e.g., destination address) and/or pairs of addresses (e.g., {master, slave}) in the packet.

In some embodiments and/or scenarios, although a plurality of addresses and/or address pairs as a whole correspond to a plurality of different paths, two or more of such addresses or address pairs may correspond to exactly the same network path, making them such addresses/address pairs redundant. Thus, in some embodiments, the master clock device 104 and/or the slave clock device 108 are configured to utilize Traceroute-based path discovery to determine addresses/address pairs that correspond to redundant paths, and then omit and/or filter addresses/address pairs to avoid using redundant paths. "Paris traceroute" and "TraceFlow" are examples of tools that discover the paths between two points in the network. Traceroute-based filtering is implemented by both the master clock device 104 and the slave clock device 108, in an embodiment. Traceroute-based filtering is implemented only on the slave clock device 108 to reduce overhead on the master clock device 104, in another embodiment.

In an embodiment, the slave clock utilizes multiple IP addresses. In an embodiment, each of at least some of the multiple IP addresses of the slave clock corresponds to a different path. In an embodiment, the master clock utilizes multiple IP addresses. In an embodiment, at least some different {master IP, slave IP} address pairs corresponds to different paths.

In some embodiments, other suitable fields in the packet header are utilized alternatively or additionally to determine different paths. Examples of other header fields utilized to determine a path include one or more of a user datagram protocol (UDP) port field, a Transmission Control Protocol (TCP) port field, the Flow Label field in an IPv6 header, a VLAN ID field in an Ethernet header, a Label field in a Multiprotocol Label Switching (MPLS) header, etc. In various embodiments, any combination of any subset of master IP address, slave IP address, a UDP port field, a TCP port field, the Flow Label field in an IPv6 header, a VLAN ID field in an Ethernet header, a Label field in an MPLS header, are utilized to determine and/or identify a path via which a packet is to be or was transmitted.

Figure 4:
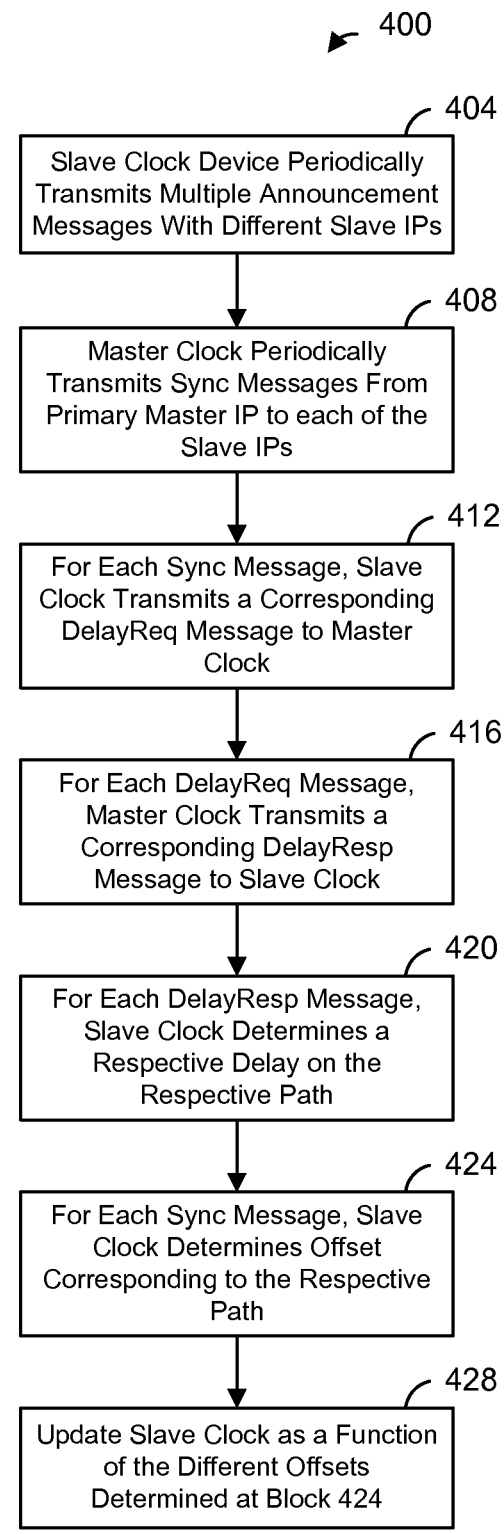
FIG. 4 is a flow diagram of an example method for maintaining a slave clock using multiple clock signals received from a master clock via multiple paths in a network, according to an embodiment.

FIG. 4 is a flow diagram of an example method 400 for maintaining a slave clock using multiple clock signals received from a master clock via multiple paths in a network, according to an embodiment. The system 100 of FIG. 1 is configured to implement the method 400, in an embodiment, and the method 400 is discussed with reference to FIG. 1 for explanatory purposes. In other embodiments, however, the method 400 is implemented by another suitable system.

FIG. 4 is described, for explanatory purposes, with reference to messages similar to messages utilized in the precision time protocol (PTP). In other embodiments, messages similar to messages utilized in the network time protocol (NTP) are utilized.

Multiple IP addresses (slave IP addresses) are associated with the slave clock, and one of the slave IP addresses is designated as a primary slave IP address, in an embodiment. Similarly, at least one IP address (master IP address) is associated with the master clock. One of the at least one master IP addresses is designated as a primary master IP address, in an embodiment. If there is only one master IP address, the single master IP address is designated as the primary slave IP address, in an embodiment.

At block 404, the slave clock device 108 periodically transmits multiple announcement messages, each announcement message in the multiple announcement messages having a different slave IP address, in an embodiment. The multiple announcement messages are received by the master clock device 104, and the master clock device 104 notes the different slave IP addresses included in the multiple announcement messages.

At block 408, after the master clock device 104 periodically transmits multiple synchronization messages to the slave clock device 108, each synchronization message in the multiple synchronization messages having one of the multiple slave IP addresses from the multiple announcement messages of block 404, in an embodiment. Each synchronization message is transmitted via a different path, and each slave IP address corresponds to a corresponding one of the different paths, in an embodiment. Each synchronization message includes the primary master IP address, in an embodiment. Each synchronization message includes a timestamp corresponding to a value of the master clock when the synchronization message was transmitted by the master clock device 104, in an embodiment.

At block 412, the slave clock device 108 transmits to the master clock device 104 a delay request message responsive to each synchronization message. Each delay request message includes one of the multiple slave IP addresses.

At block 416, the master clock device 104 transmits to the slave clock device 108 a delay response message responsive to each delay response message from the slave clock device 108. Each delay response message includes one of the multiple slave IP addresses, and each delay response message is transmitted via a different path, in an embodiment. Each delay response message includes the primary master IP address, in an embodiment.

At block 420, the slave clock device 108 receives the multiple delay response messages transmitted by the master clock device 104 at block 416. For each delay response message received at block 420, the slave clock device 108 determines a delay corresponding to the path via which the delay response message was received. In an embodiment, the slave clock device 108 determines the delay based on (i) when the delay response message was received at the slave clock device 108, and (ii) when the corresponding delay request message (block 412) was transmitted by the slave clock device 108. For each delay response message received at block 420, the slave clock device 108 determines the path via which the message was received based on the slave IP address in the message, in an embodiment.

At block 424, the slave clock device 108 receives multiple synchronization messages periodically transmitted by the master clock device 104 at block 408. For each synchronization message received by the slave clock device 108, the slave clock device 108 determines a clock offset corresponding to the path via which the synchronization message was received. In an embodiment, the slave clock device 108 determines the clock offset based on (i) a value of the slave clock when the synchronization message was received at the slave clock device 108, (ii) the master clock time stamp in the synchronization message, and (iii) the delay for the corresponding path (block 420). For each synchronization message received by the slave clock device 108, the slave clock device 108 determines the path via which the message was received based on the slave IP address in the message, in an embodiment.

At block 428, the slave clock device 108 updates the slave clock as a function of the different offsets, determined at block 424, corresponding to the different paths, in an embodiment.

In some embodiments, multiple master IP addresses are associated with the master clock, where one of the at least one master IP addresses is designated as a primary master IP address, in an embodiment. In some embodiments, respective synchronization messages for each {master IP, slave IP} address pair are periodically transmitted by the master clock device 104 at block 408, and the different {master IP, slave IP} address pairs correspond to different paths. In some embodiments, the slave clock device 108 transmits, at block 412, a corresponding delay request message to the master IP address included in the delay request message. In some embodiments, for each delay response message received at block 420, the slave clock device 108 determines the path via which the message was received based on the {master IP, slave IP} address pair in the message. In some embodiments, for each synchronization message received by the slave clock device 108, the slave clock device 108 determines the path via which the message was received based on the {master IP, slave IP} address pair in the message.

Figure 5:
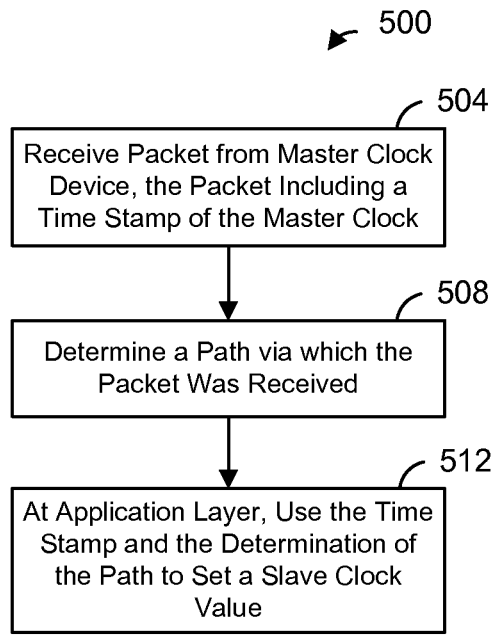
FIG. 5 is a flow diagram of an example method for maintaining a slave clock using a packet received from a master clock, according to an embodiment.

FIG. 5 is a flow diagram of an example method 500 for setting a slave clock, according to an embodiment. The slave clock device 108 of FIG. 1 is configured to implement the method 500, in an embodiment, and the method 500 is discussed with reference to FIG. 1 for explanatory purposes. In other embodiments, however, the method 500 is implemented by another suitable device.

At block 504, a packet is received at the slave clock device 108, the packet having been transmitted by the master clock device 104. The packet includes a time stamp corresponding to the master clock. In an embodiment, the time stamp corresponds to a value of the master clock when the packet was transmitted by the master clock.

At block 508, the slave clock device 108 determines via which one of multiple paths the packet was received at block 504. In an embodiment, the slave clock device 108 determines via which one of the multiple paths based on an address in the packet. In an embodiment, the slave clock device 108 determines via which one of the multiple paths based on a slave IP address in the packet. In an embodiment, the slave clock device 108 determines via which one of the multiple paths based on a pair of addresses in the packet. In an embodiment, the slave clock device 108 determines via which one of the multiple paths based on a {master IP, slave IP} address pair in the packet.

In an embodiment, the clock synchronization module 150 of the slave clock device 108 is configured to determine via which one of multiple paths the packet was received at block 504. In an embodiment, some other module of the slave clock device 108 is configured to determine via which one of multiple paths the packet was received at block 504. In some embodiments, the module implementing block 508 operates at the application layer in the multi-layer communication protocol stack (e.g., the TCP/IP protocol stack), and/or operates at another suitable layer at least at a fourth layer in a multi-layer communication protocol stack (e.g., corresponding to the OSI model). In an embodiment, the module implementing block 508 is an application layer module and/or operates at a fourth layer or above in a multi-layer communication protocol stack, and also determines via which one of multiple network paths the packet was received at block 504. In other embodiment, the module implementing block 508 operates at a layer below the application layer and/or below the further layer in the multi-layer protocol stack.

At block 512, the slave clock device 108 uses the path information determined at block 508 and the time stamp in the packet received at block 504 to set the slave clock value. In an embodiment, block 512 is performed at the application layer in a multi-layer communication protocol stack, and/or operates at another suitable layer at least at the fourth layer in the multi-layer communication protocol stack, and also utilizes network path information to set the slave clock value. In an embodiment, block 512 is implemented by the clock synchronization module and/or the clock module 160.

In some embodiments, setting the slave clock value at block 512 is implemented according to the various techniques discussed above with respect to FIGS. 1, 2A, 2B, and 3. For example, different clock results corresponding to the plurality of different communication paths through the network 112 are determined and utilized to set the slave clock as discussed above, in some embodiments.

Figure 6:
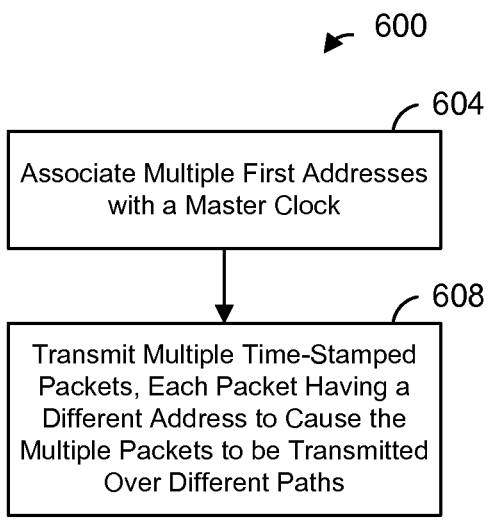
FIG. 6 is a flow diagram of an example method for facilitating determining clock values across a network, according to an embodiment.

FIG. 6 is a flow diagram of an example method 600 for facilitating determining clock values across a network, according to an embodiment. The master clock device 104 of FIG. 1 is configured to implement the method 600, in an embodiment, and the method 600 is discussed with reference to FIG. 1 for explanatory purposes. In other embodiments, however, the method 600 is implemented by another suitable device.

At block 604, multiple first addresses are associated with the master clock. For example, multiple IP addresses (master IP addresses) are associated with the master clock by the clock module 120, in an embodiment.

At block 608, multiple time-stamped packets are transmitted by the master clock device 104 to the slave clock device 108, where each packet includes a different one of the multiple addresses of block 604. The different master IP addresses in the multiple time-stamped packets cause, at least partially, the multiple time-stamped packets to be transmitted over different paths in the network 112. In some embodiments, the multiple packets include multiple slave IP addresses, and the different {master IP, slave IP} address pairs cause, at least partially, the multiple time-stamped packets to be transmitted over different paths in the network 112.

Figure 7:
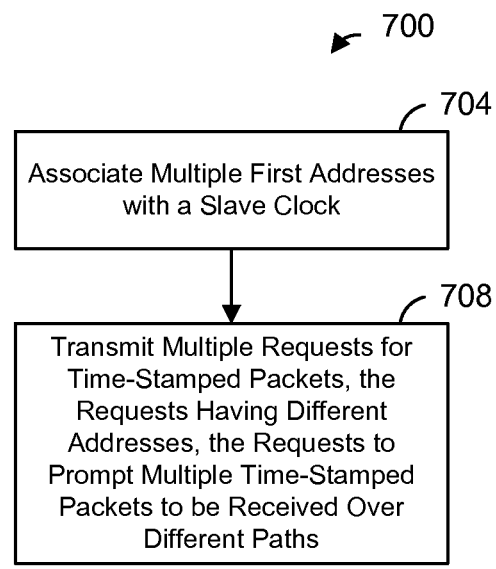
FIG. 7 is a flow diagram of another example method for facilitating determining clock values across a network, according to an embodiment.

FIG. 7 is a flow diagram of an example method 700 for facilitating determining clock values across a network, according to an embodiment. The slave clock device 108 of FIG. 1 is configured to implement the method 700, in an embodiment, and the method 700 is discussed with reference to FIG. 1 for explanatory purposes. In other embodiments, however, the method 700 is implemented by another suitable device.

At block 704, multiple first addresses are associated with the slave clock. For example, multiple IP addresses (slave IP addresses) are associated with the slave clock by the clock module 160, in an embodiment.

At block 708, multiple requests are transmitted to the master clock device 104, the multiple requests including the multiple addresses to cause the master clock device 104 to transmit multiple time-stamped packets via different paths in the network 112, so that the multiple time-stamped packets are received by the slave clock device 108 via different paths in the network 112. The different slave IP addresses in the requests cause, at least partially, the multiple time-stamped packets to be received over different paths in the network 112. In some embodiments, the multiple packets include multiple master IP addresses, and the different {master IP, slave IP} address pairs cause, at least partially, the multiple time-stamped packets to be received over different paths in the network 112.

In an embodiment, an algorithm similar to the Best Master Clock Algorithm (BMCA) is utilized. For example, the slave clock device is configured to run BMCA to find the best instances of the same master clock, the different instances corresponding to different paths. The slave clock then utilizes the selected instances of the master using techniques such as described above.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable memory such as a magnetic disk, an optical disk, a random access memory, a read only memory, a flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device, etc.

While various embodiments have been described with reference to specific examples, which are intended to be illustrative only and not to be limiting, changes, additions and/or deletions may be made to the disclosed embodiments without departing from the scope of the claims.

What is claimed is:

1. A network device, comprising:
one or more ports coupled to a network;
a path determination module configured to determine via which ones of a plurality of communication paths in the network multiple packets from a master clock were received, wherein the multiple packets are received via ones of the one or more ports, and wherein the multiple packets include respective time stamps from the master clock; and
an application layer module configured to
determine, using (i) the respective time stamps in the multiple packets and (ii) the determinations of via which ones of the plurality of communication paths the multiple packets were received, path time data for respective ones of the plurality of communication paths,
compare (i) first path characteristics corresponding to only a single communication path of the plurality of communication paths and (ii) second path characteristics corresponding to at least two communication paths of the plurality of communication paths, and
select, based on the comparison, (i) a first technique for determining time information using path time data for only the single communication path or (ii) a second technique for determining the time information using a mathematical combination of path time data for the at least two communication paths;
wherein the path determination module and the application layer module are implemented on one or more integrated circuit devices.

2. The network device of claim 1, wherein the path determination module is configured to determine via which ones of the plurality of communication paths the multiple packets were received using respective path identifiers included in the multiple packets.

3. The network device of claim 1, wherein the path determination module is configured to determine via which ones of the plurality of communication paths the multiple packets were received based on respective one or more Internet Protocol (IP) addresses in the multiple packets.

4. The network device of claim 3, wherein the path determination module is configured to determine via which ones of the plurality of communication paths the multiple packets were received based on (i) respective source IP addresses in the multiple packets and (ii) respective destination IP addresses in the multiple packets.

5. The network device of claim 3, wherein the path determination module is configured to determine via which ones of the plurality of communication paths the multiple packets were received based on information in headers of the multiple packets.

6. The network device of claim 1, wherein the path determination module is included in the application layer module.

7. The network device of claim 1, wherein the application layer module is configured to cause a plurality of requests to be transmitted to the master clock via the network, wherein the plurality of requests are configured to prompt the master clock to transmit the multiple packets, and wherein each request indicates a different communication path via which a corresponding one of the multiple packets is to be transmitted by the master clock.

8. A method, comprising:
receiving, via a plurality of ports of a network device, multiple packets transmitted by a master clock via a network, wherein the multiple packets include respective time stamps from the master clock;
determining via which ones of a plurality of communication paths in the network the multiple packets were received;
using, at an application layer module implemented on one or more integrated circuit devices of the network device, (i) the respective time stamps in the multiple packets and (ii) the determinations of via which ones of the plurality of communication paths the multiple packets were received, to determine path time data for respective ones of the plurality of communication paths;
comparing, at the application layer module, (i) first path characteristics corresponding to only a single communication path of the plurality communication paths and (ii) second path characteristics corresponding to at least two communication paths of the plurality of communication paths; and
selecting, at the application layer module based on the comparison, (i) a first technique for determining time information using path time data for only the single communication path or (ii) a second technique for determining the time information using a mathematical combination of path time data for the at least two communication paths.

9. The method of claim 8, wherein determining via which ones of the plurality of communication paths the multiple packets were received comprises analyzing respective path identifiers included in the multiple packets.

10. The method of claim 9, wherein determining via which ones of the plurality of communication paths the multiple packets were received comprises determining via which ones of the plurality of communication paths the multiple packets were received based on respective one or more Internet Protocol (IP) addresses in the multiple packets.

11. The method of claim 8, wherein determining via which ones of the plurality of communication paths the multiple packets were received comprises determining via which ones of the plurality of communication paths the multiple packets were received based on (i) respective source IP addresses in the multiple packets and (ii) respective destination IP addresses in the multiple packets.

12. The method of claim 8, wherein determining via which ones of the plurality of communication paths the multiple packets were received comprises determining via which ones of the plurality of communication paths the multiple packets were received based on information in respective headers of the multiple packets.

13. The method of claim 8, further comprising causing, with the application layer module, a plurality of requests to be transmitted to the master clock via the network, wherein the plurality of requests are configured to prompt the master clock to transmit the multiple packets, and wherein each request indicates a different communication path via which a corresponding one of the multiple packets is to be transmitted by the master clock.

14. A system, comprising:
a first network device, comprising
one or more first ports coupled to a network; and
a clock module configured to:
associate multiple addresses with a master clock, and
cause multiple time-stamped packets to be transmitted, respective ones of the multiple time-stamped packets including respective ones of the multiple addresses to cause the multiple time-stamped packets to be transmitted via different communication paths among a plurality of communication paths in the network; and a second network device, comprising
one or more second ports coupled to the network;
a path determination module configured to determine via which ones of the plurality of communication paths in the network at least some of the multiple time-stamped packets from the master clock were received, wherein the at least some of the multiple time-stamped packets are received via ones of the one or more second ports, and wherein the at least some of the multiple time-stamped packets include respective time stamps from the master clock; and
an application layer module configured to
determine, using (i) the respective time stamps in the at least some of the multiple time-stamped packets and (ii) the determinations of via which ones of the plurality of communication paths the at least some of the multiple time-stamped packets were received, path time data for respective ones of the plurality of communication paths,
compare (i) first path characteristics corresponding to only a single communication path of the plurality communication paths and (ii) second path characteristics corresponding to at least two communication paths of the plurality of communication paths, and
select, based on the comparison, (i) a first technique for determining time information using path time data for only the single communication path or (ii) a second technique for determining the time information using a mathematical combination of path time data for the at least two communication paths;
wherein the path determination module and the application layer module are implemented on one or more integrated circuit devices.

15. The system of claim 14, wherein the clock module is configured to:
associate multiple IP addresses with the master clock, and
include, in respective ones of the multiple time-stamped packets, respective ones of the multiple IP addresses.

16. The system of claim 14, wherein the clock module is an application layer module.

17. The system of claim 14, wherein the clock module is configured to operate at at least a fourth layer in a multi-layer protocol stack.

18. The system of claim 14, wherein the clock module is configured to include, in the respective ones of the multiple time-stamped packets, respective ones of the multiple addresses corresponding to a single slave clock.

19. A method, comprising:
associating, at a first network device that implements a master clock, multiple addresses with the master clock; and
transmitting multiple time-stamped packets to a second network device, respective ones of the multiple time-stamped packets including respective ones of the multiple addresses to cause the multiple packets to be transmitted via different paths of a plurality of communication paths in a network,
receiving, at a second network device that implements a slave clock, at least some of the multiple time-stamped packets transmitted by the first network device, wherein the at least some of the multiple time-stamped packets include respective time stamps from the master clock;
determining via which ones of the plurality of communication paths in the network the at least some of the multiple time-stamped packets were received;
using, at an application layer module implemented on one or more integrated circuit devices of the second network device, (i) the respective time stamps in the at least some of the multiple time-stamped packets and (ii) the determinations of via which ones of the plurality of communication paths the at least some of the multiple time-stamped packets were received, to determine path time data for respective ones of the plurality of communication paths;
comparing, at the application layer module, (i) first path characteristics corresponding to only a single communication path of the plurality of communication paths and (ii) second path characteristics corresponding to at least two communication paths of the plurality of communication paths; and
selecting, at the application layer module based on the comparison, (i) a first technique for determining time information using path time data for only the single communication path or (ii) a second technique for determining the time information using a mathematical combination of path time data for the at least two communication paths.

20. The method of claim 19, wherein associating multiple addresses with the master clock comprises associating multiple IP addresses with the master clock; and
wherein the method further comprises including respective ones of the multiple IP addresses in respective ones of the multiple time-stamped packets.

21. The method of claim 19, wherein associating the multiple addresses with the master clock is performed by an application layer module in the first network device.

22. The method of claim 19, wherein associating the multiple addresses with the master clock is performed by a module operating at at least a fourth layer in a multi-layer protocol stack.

23. The method of claim 19, further comprising including in the multiple time-stamped packets respective ones of multiple slave IP addresses corresponding to the slave clock.

24. A network device, comprising:
one or more ports coupled to a network;
a clock module configured to:
associate multiple addresses with a slave clock, and
transmit multiple requests for multiple time-stamped packets to be received from a master clock via different paths among a plurality of communication paths in the network, respective ones of the multiple requests including respective ones of the multiple addresses of the slave clock;
a path determination module configured to determine via which ones of the plurality of communication paths in the network at least some of the multiple time-stamped packets from the master clock were received, wherein the at least some of the multiple time-stamped packets are received via ones of the one or more ports, and wherein the at least some of the multiple time-stamped packets include respective time stamps from the master clock; and
an application layer module configured to
determine, using (i) the respective time stamps in the at least some of the multiple time-stamped packets and (ii) the determinations of via which one of the plurality of communication paths the at least some of the multiple time-stamped packets were received, path time data for respective ones of the plurality of communication paths, compare (i) first path characteristics corresponding to only a single communication path of the plurality of communication paths and (ii) second path characteristics corresponding to at least two communication paths of the plurality of communication paths, and select, based on the comparison, (i) a first technique for determining time information using path time data for only the single communication path or (ii) a second technique for determining the time information using a mathematical combination of path time data for the at least two communication paths;

wherein the clock module, the path determination module and the application layer module are implemented on one or more integrated circuit devices.

25. The network device of claim 24, wherein the clock module is configured to:

associate the multiple addresses with the slave clock at least by associating multiple IP addresses with the slave clock, and include, in respective ones of the multiple time-stamped packets, respective ones of the multiple IP addresses.

26. The network device of claim 24, wherein the clock module is an application layer module.

27. The network device of claim 24, wherein the clock module is configured to operate at at least a fourth layer in a multi-layer protocol stack.

28. The network device of claim 24, wherein the clock module is configured to include, in respective ones of the multiple requests, respective ones of multiple IP addresses corresponding to the master clock.

29. A method, comprising:

associating, at a first network device that implements a slave clock, multiple addresses with the slave clock;

transmitting multiple requests to a second network device, respective ones of the multiple requests including respective ones of the multiple addresses to cause multiple time-stamped packets to be transmitted by the second network device via different communication paths among a plurality of communication paths in a network;

receiving, at the first network device, at least some of the multiple time-stamped packets transmitted by the second network device via the network, wherein the at least some of the multiple time-stamped packets include respective time stamps from a master clock;

determining via which ones of the plurality of communication paths in the network the at least some of the multiple time-stamped packets were received;

using, at an application layer module implemented on one or more integrated circuit devices of the first network device, (i) the respective time stamps in the at least some of the multiple time-stamped packets and (ii) the determinations of via which ones of the plurality of communication paths the at least some of the multiple time-stamped packets were received, to determine path time data for respective ones of the plurality of communication paths;

comparing, at the application layer module, (i) first path characteristics corresponding to only a single communication path of the plurality of communication paths and (ii) second path characteristics corresponding to at least two communication paths of the plurality of communication paths; and selecting, at the application layer module based on the comparison, (i) a first technique for determining time information using path time data for only the single communication path via or (ii) a second technique for determining the time information using a mathematical combination of path time data for the at least two communication paths.

30. The method of claim 29, wherein associating the multiple addresses with the slave clock comprises associating multiple IP addresses with the slave clock; and wherein the method further comprises including respective ones of the multiple IP addresses in respective ones of the multiple requests.

31. The method of claim 29, wherein associating the multiple addresses with the slave clock is performed at an application layer.

32. The method of claim 29, wherein associating the multiple addresses with the slave clock is performed by a module operating at at least a fourth layer in a multi-layer protocol stack.

33. The method of claim 29, further comprising including, in respective ones of the multiple requests, respective ones of multiple IP addresses corresponding to the master clock.

* * * * *